United States Patent [19]

Musha

[11] 4,408,313
[45] Oct. 4, 1983

[54] OBJECTIVE LENS DRIVING DEVICE FOR TRACKING AND FOCUS CORRECTIONS

[75] Inventor: Toru Musha, Hachioji, Japan

[73] Assignee: Olympus Optical Company Limited, Tokyo, Japan

[21] Appl. No.: 216,522

[22] Filed: Dec. 15, 1980

[30] Foreign Application Priority Data

Jul. 9, 1980 [JP] Japan .............................. 55-93568

[51] Int. Cl.³ .............................................. G11B 7/12
[52] U.S. Cl. ...................................... 369/45; 369/44
[58] Field of Search .................................. 369/43–46; 358/127–132; 360/77–78

[56] References Cited

U.S. PATENT DOCUMENTS

| | | | |
|---|---|---|---|
| 4,239,942 | 12/1980 | Van Alem et al. | 360/77 |
| 4,253,126 | 2/1981 | Kuribayashi et al. | 360/77 |
| 4,302,830 | 11/1981 | Hamaoka et al. | 369/44 |

*Primary Examiner*—Raymond F. Cardillo, Jr.
*Attorney, Agent, or Firm*—Parkhurst & Oliff

[57] ABSTRACT

An objective lens driving device useable in an information reading-out apparatus for projecting a light spot onto a record medium which has been spirally or concentrically recorded with one or more information tracks and for reading-out the information, which drives the objective lens in a direction perpendicular to its optical axis and the information track, thereby correcting relative positional error, i.e. tracking error, between the information track and the light spot. It comprises at least one set of objective lens driving means, each set including a movable member movable together with the objective lens, a coil wound around a stationary yoke, and an objective lens supporting means for movably supporting the objective lens in a direction perpendicular to the optical axis of the objective lens and information track, said coil being supplied with an electric current corresponding to a tracking error signal representing the relative positional error so as to displace the movable member and objective lens and information track and thereby to correct the tracking error.

8 Claims, 12 Drawing Figures

OBJECTIVE LENS DRIVING DEVICE FOR TRACKING AND FOCUS CORRECTIONS

BACKGROUND OF THE INVENTION

1. Field of the Invention

This invention relates to an objective lens driving device useable with an information reading-out apparatus which projects a light spot onto a record medium which has been spirally or concentrically recorded with one or more information tracks and reads-out the information. The objective lens is driven in a direction perpendicular to its optical axis and the information track for the purpose of correcting relative positional error, i.e. tracking error, between the information track and the light spot.

2. Description of the Prior Art

The above mentioned information reading-out apparatus is well known and the record medium including the information track is usually called a video disc. In this video disc, encoded video and audio signals are recorded as optical information by means of optical transmitting properties, reflection phase properties, or the like. The video disc is rotated at a high speed and a laser beam emitted from a laser light source is focussed through an objective lens onto the information track and the reflected or transmitted light modulated by the information track is detected and read out. An important property of such a record medium is the very high density of recorded information possible and thus the width of the information track is very narrow and the space between successive tracks is also very narrow. Therefore, the diameter of the light spot should be made correspondingly small. In order to pick up correctly the recorded information from such tracks having very narrow width and pitch, the relative positional error between the light spot and the information track, i.e. the tracking error, should be made as small as possible.

It has been proposed to effect so-called tracking control in which the relative displacement of the light spot and the information track is photoelectrically detected to produce a tracking error signal and the light spot is moved in a direction perpendicular to the track in response to the detected tracking error signal.

As such a tracking mechanism, it has been proposed to use an oscillating mirror inserted in an optical path from a laser light source to an objective lens, and to rotate the mirror in response to the detected tracking error signal. However, such a tracking mechanism could not attain sufficiently high accuracy and response and is liable to be large and expensive.

In order to avoid the above-mentioned drawbacks of known tracking mechanisms, it has been further proposed to support the objective lens or its holding frame by a resilient supporting member composed of leaf springs and to move the objective lens in a direction perpendicular to its optical axis as well as to the tangential direction of the information track by means of an electromechanical transducer in response to the tracking error signal. In such a tracking mechanism which makes use of leaf springs, the electro-mechanical transducer may be an electromagnet, voice coil, piezoelectric element or the like. In order to obtain a good response property for tracking, the assembly should be made small and lightweight. In an actual reading-out apparatus, in addition to the tracking error a so-called focussing error is produced in which the light spot could not be correctly focussed on the information track. For correcting the focussing error, a focussing mechanism must be provided for displacing the objective lens in the direction of its optical axis. When the tracking mechanism is mounted on the focussing mechanism, the tracking mechanism should be smaller and lighter in weight for attaining accurate focussing correction.

In a tracking mechanism with an electromagnet, a sufficient force necessary for moving the objective lens can be produced and the mechanism can be made small and lightweight in a relatively easy manner. However, accurate tracking correction could not be effected, because the relation between the amount of electric current passing through a coil of the electromagnet and the amount of displacement of the objective lens is not linear. In the tracking mechanism comprising a voice coil, miniaturization could hardly be attained. Further, the tracking mechanism with the piezoelectric elements could not produce sufficiently large force for driving the objective lens.

SUMMARY OF THE INVENTION

An object of the invention, therefore, is to provide an objective lens driving device which can move an objective lens in a tracking direction in a linear manner in response to the amount of tracking error signal; which can produce a sufficiently large driving force necessary for obtaining excellent response; which can easily be made small and lightweight; and which can drive the objective lens in two-dimensions, i.e. in both the tracking direction and the focussing direction.

A feature of the invention is the provision in an objective lens driving device for correcting relative positional error, i.e. tracking error between an information track recorded spirally or concentrically on a record medium and a reading-out light spot projected onto the record medium by means of the objective lens. A further object of the invention is the provision of a device which comprises at least one set of objective lens driving means, each set including a movable member comprising a magnetic body which is movable together with the objective lens or its holding frame; a stationary yoke extending in a direction which is substantially parallel to the moving direction of said movable member and distant from (i.e. spaced apart from with an interposing gap) and opposed to said movable member; a magnetic field generation means for producing a closed loop magnetic field passing through the movable member and stationary yoke; and a coil wound around the stationary yoke such that at least one portion of the coil is exposed to the magnetic field produced by the magnetic field generation means; and in which objective lens supporting means is provided for movably supporting the objective lens in a direction perpendicular to the optical axis of the objective lens and information track and said coil is supplied with an electric current, corresponding to a tracking error signal representing the relative positional error, so as to displace the movable member comprising the magnetic body and hence the objective lens in a direction perpendicular to the optical axis of the objective lens and information track and thereby correct the tracking error.

Further objects and features of the invention will be fully understood from the following detailed description with reference to the accompanying drawings, wherein:

DETAILED DESCRIPTION OF THE PREFERRED EMBODIMENTS

Figure 1A:
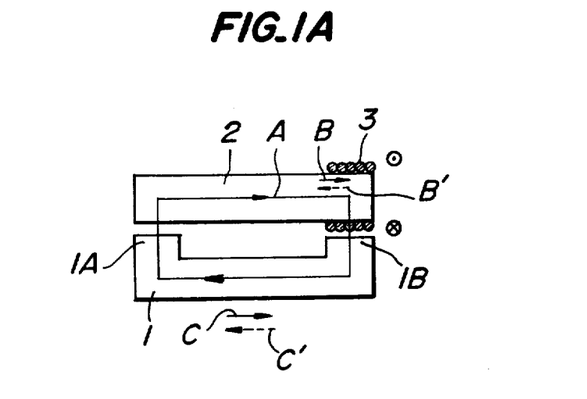
FIG. 1A is a diagrammatic view of an example of a driving means for an objective lens driving device according to the invention.
Figure 1B:
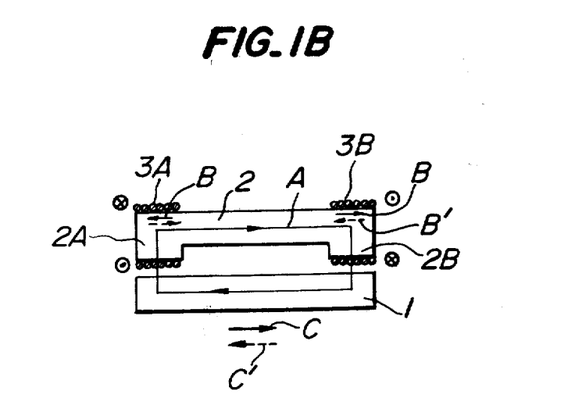
FIG. 1B is a diagrammatic view of another example of a driving means for an objective lens driving device according to the invention.

FIGS. 1A and 1B show two examples of a driving means for an objective lens driving device according to the invention. In the example shown in FIG. 1A, a movable member 1 comprising a magnetic body and a stationary yoke 2 are arranged substantially in parallel and spaced apart from each other. The movable member 1 is provided at both ends thereof with projections 1A and 1B made integral therewith and extending toward the stationary yoke 2. One portion of the movable member 1 and stationary yoke 2 may be composed of a permanent magnet or may be magnetized to form a magnetic path shown by arrow A in FIG. 1A. In addition, around one end of the stationary yoke 2 is wound a coil 3 such that at least one portion thereof is exposed to the magnetic field shown by arrow A. If the coil 3 present in the magnetic field is supplied with an electric current, the coil 3 is subjected to a force. If the electric current flows through the coil 3 in a direction shown by symbols ⊗ , ⊙ , a magnetic field shown by arrow B is formed. This magnetic field B is the same in direction as the magnetic field A, thereby increasing the magnetic field A. These magnetic fields A and B serve to cause that portion of the coil 3 which is exposed to the magnetic field A to move to the left in response to the amount of electric current. Since the coil 3 is wound around the stationary yoke 2 and cannot be moved, it functions to move the movable member 1 to the right as shown by arrow C. If the electric current flowing through the coil 3 is reversed in direction, the magnetic field B' is produced so as to decrease the magnetic field A and the movable member 1 is moved to the left as shown by arrow C'.

FIG. 1B shows another example of a driving means for an objective lens driving device according to the invention. In this example, a stationary yoke 2 is provided at both ends thereof with projections 2A, 2B extending toward a movable member 1. Coils 3A, 3B are wound around these projections 2A, 2B such that at least one portion of these coils 3A, 3B is exposed to the magnetic field A. If the coils 3A, 3B are supplied with electric currents in the directions shown by symbols ⊗ , ⊙ in FIG. 1B such that those portions of the coils 3A, 3B which are exposed to the magnetic field A are subjected to forces in the same direction, a magnetic field B is produced and functions in that portion of the stationary yoke 2 around which is wound the coil 3A to decrease the magnetic field A while in that portion of the stationary yoke 2 around which is wound the coil 3B to increase the magnetic field A. These magnetic fields A and B function to move the movable member 1 in a direction shown by arrow C in response to the amount of electric current flowing through the coils 3A, 3B in the same manner as in the example shown in FIG. 1A. If the directions of the electric currents flowing through the coils 3A, 3B are reversed, the magnetic field B' thus produced becomes reversed in direction and hence the movable member 1 is moved in a direction shown by arrow C'.

In the driving means shown in FIGS. 1A and 1B, if one portion of the coils 3, 3A, 3B is exposed to a magnetic field A of a closed loop produced by a magnetic field generation means not shown, the movable member 1 or stationary yoke 2 does not always need the projections 1A, 1B or 2A, 2B.

In the present invention, an objective lens driving device is provided which is constructed such that use is made of at least one set of driving means shown in FIGS. 1A and 1B, in which the objective lens or its holding body is secured to and made integral with the movable member 1 such that the movable member 1 is moved in a linear manner in directions shown by arrows C, C' and perpendicular to the optical axis of the objective lens and to the information track.

Figure 2:
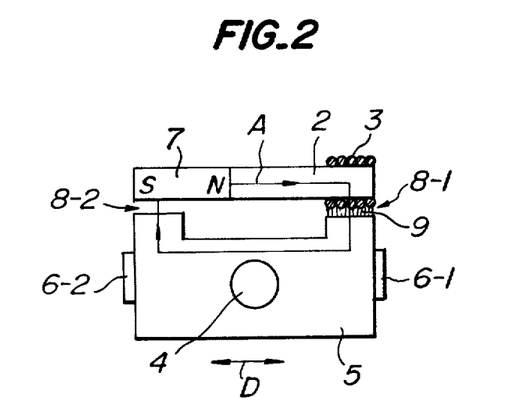
FIGS. 2 to 7 are diagrammatic views of first to sixth embodiments of an objective lens driving device according to the invention, each making use of the driving means shown in FIG. 1A.

FIG. 2 shows a first embodiment of an objective lens driving device according to the invention. In this embodiment, use is made of one set of driving means as shown in FIG. 1A. A holding frame 5 of an objective lens 4 comprises a magnetic body and is supported movably in directions shown by arrow D and perpendicular to the optical axis of the objective lens 4 and to the information track not shown by means of an objective lens supporting means comprising a pair of leaf springs 6-1, 6-2. The leaf springs 6-1, 6-2 extend in a direction perpendicular to the drawing surface in FIG. 2. Each of the leaf springs 6-1, 6-2 is secured at one end to the holding frame 5 and at the other end to a stationary member not shown. In the present embodiment, the magnetic field generation means comprises a permanent magnet 7 constituting one end portion of the stationary yoke 2 and forming a closed loop magnetic circuit A passing through the stationary yoke 2 and movable holding frame 5. In addition, a space 8-1 formed between the coil 3 and the holding frame 5 is filled with magnetic fluid 9 which is made by Ferroluidics Co. and is available under the trade name of Ferrofluid.

In the objective lens driving device shown in FIG. 2, if the coil 3 wound around the stationary yoke 2 is supplied with an electric current corresponding to the direction of the tracking error and amount thereof, the holding frame 5 is moved in response to the electric current in one of the directions shown by arrow D as described with reference to FIG. 1. As a result, it is possible to correct the tracking error in a precise manner.

In addition, the leaf springs 6-1, 6-2 support the objective lens 4 and its holding frame 5 only, so that the movable member is lightweight and the device as a whole is small and relatively inexpensive. Moreover, the space or gap formed between the stationary yoke 2 and permanent magnet 7 on the one hand and the holding frame 5 on the other hand can easily be adjusted, so that an optimum amount of space can easily be defined by taking the spring constant of the leaf spring into consideration. The magnetic fluid 9 in the space or gap 8-1 remains as it is in a stable manner due to the strong magnetic field in the space or gap 8-1, so that the viscosity of the magnetic fluid 9 can produce a damping effect, thereby improving the utility efficiency of the magnetic flux. Alternatively, the magnetic fluid 9 may be in a space or gap 8-2 only formed between the permanent magnet 7 and the holding frame 5 or may be in both the spaces or gaps 8-1 and 8-2. In these cases, an effect which is the same as that described above can also be obtained.

Figure 3:
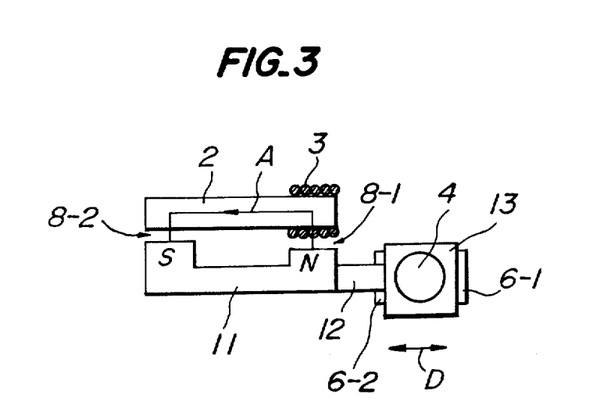

FIG. 3 shows a second embodiment of an objective lens driving device according to the invention. In the present embodiment, use is made of one set of the driving means constructed as described with reference to FIG. 1A. But, in this embodiment, the movable member comprises a permanent magnet 11 which is operative as a magnetic field generation means. The permanent magnet 11 functions to form a closed loop magnetic field A crossing the coil 3 and passing through the stationary yoke 2. The permanent magnet 11 is connected through an arm 12 comprising a non-magnetic body to a holding frame 13 for enclosing the objective lens 4 therein. The holding frame 13 movably supported by a pair of leaf springs 6-1, 6-2 in the movable direction of the movable permanent magnet 11, that is, the direction shown by arrow D which is perpendicular to the optical axis of the objective lens 4 and to the information track not shown.

As can be seen from the description with reference to FIGS. 1A, 1B and 2, if the coil 3 is supplied with an electric current corresponding to the direction of the tracking error and to the amount thereof, it is possible to correct the tracking error precisely. In addition, the movable member is lightweight and the device as a whole is small and relatively inexpensive. In addition, the distance of the spaces 8-1 and 8-2 formed between the permanent magnet 11 and the stationary yoke 2 in the path of the magnetic field A can easily be adjusted. If either one or both of these spaces 8-1 and 8-2 is filled with the magnetic fluid, it is possible to improve the damping effect and the utility efficiency of the magnetic flux.

Figure 4:
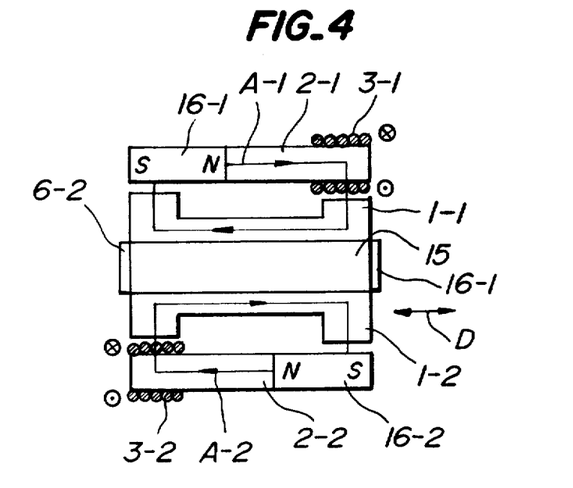
Figure 5:
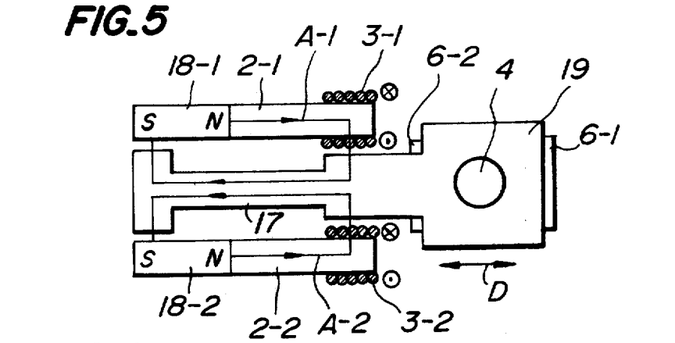
Figure 6:
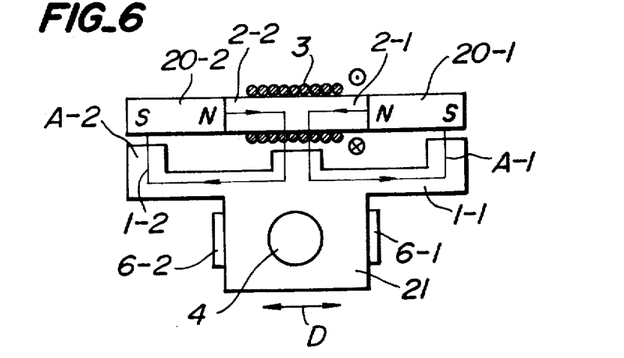

FIGS. 4, 5 and 6 show third, fourth and fifth embodiments of an objective lens driving device according to the invention. In these embodiments, use is made of two sets of driving means constructed as described with reference to FIG. 1A.

In the embodiment shown in FIG. 4, the objective lens 4 is held by a holding frame 15 comprising a non-magnetic body, and the holding frame 15 is movably supported by a pair of leaf springs 6-1, 6-2 in the tracking error direction shown by arrow D. Two sets of driving means are arranged in a direction perpendicular to the tracking error direction D and the distribution of magnetic flux produced from these driving means is made substantially symmetrical with respect to the optical axis of the objective lens 4. For this purpose, to those sides of the holding frame 15 which are located in a direction perpendicular to the tracking error direction D are secured movable members 1-1, 1-2 comprising magnetic bodies for constituting respective sets of driving means. Provision is made of stationary yokes 2-1, 2-2 extending in parallel with the moving directions D and spaced apart from the movable members 1-1, 1-2, respectvely. Around these stationary yokes 2-1, 2-2 are wound coils 3-1, 3-2 which are symmetrical with respect to the optical axis of the objective lens 4. The magnetic field generation means may be secured to any portion of the movable member and stationary yoke provided closed loop magnetic fields A-1, A-2 crossing the coils 3-1, 3-2 and passing through the movable member and stationary yoke are symmetrical with respect to the optical axis of the objective lens 4. In this embodiment, permanent magnets 16-1, 16-2 are secured to those ends of the stationary yokes 2-1, 2-2 which are opposite to the end portions thereof around which are wound the coils 3-1, 3-2, respectively, and are made symmetrical with respect to the optical axis of the objective lens 4.

In the embodiment shown in FIG. 5, a movable member 17 comprising a magnetic body is used in conjunction with two sets of driving means. Provision is made of opposed stationary yokes 2-1, 2-2 extending in a direction which is substantially parallel to the moving direction D of the movable member 17, i.e. the tracking error correction direction, and spaced apart from the movable member 17.

In the embodiment shown in FIG. 6, two sets of driving means are connected with each other or made integral into one body and a coil 3 adapted to be supplied with an electric current corresponding to the tracking error signal is wound around the stationary yokes 2-1, 2-2 of respective sets in common to the two sets of driving means. The magnetic field generation means comprises permanent magnets 20-1, 20-2 secured to the stationary yokes 2-1, 2-2, respectively. The permanent magnet 20-1 is operative to form a closed loop magnetic field A-1 crossing the stationary yoke 2-1 and coil 3 and passing through a movable member 1-1 which comprises a magnetic body, whereas the permanent magnet 20-2 is operative to form a closed loop magnetic field A-2 crossing the stationary yoke 2-2 and coil 3 and passing through a movable member 1-2 which comprises a magnetic body. In addition, the objective lens 4 is held by a holding frame 21 made integral with or separated from the movable members 1-1, 1-2. The holding frame 21 is movably supported by a pair of leaf springs 6-1, 6-2 in the tracking error correction direction shown by the arrow D. If the holding frame 21 must be separated from the movable members 1-1, 1-2, the holding frame 21 may comprise a non-magnetic body.

In the objective lens driving devices shown in FIGS. 4 to 6, use has been made of two sets of driving means. As a result, if respective coils are supplied with an electric current corresponding to the amount of tracking error in the direction shown by symbols ⊗ , ⊙ or in the opposite direction in response to the tracking error direction, it is possible to produce a large amount of force which is sufficient to move the movable member and hence the objective lens, thereby correcting the tracking error in a precise manner.

Particularly, in the embodiment shown in FIG. 4, the magnetic flux distribution of the magnetic fields A-1, A-2 and those produced by the coils 3-1, 3-2 are substantially symmetrical with respect to the optical axis of the objective lens 4. As a result, if the embodiment shown in FIG. 4 is incorporated into a focussing driving mechanism shown in FIGS. 10A and 10B for the purpose of displacing the objective lens 4 in two-dimensions, i.e. in its optical axis direction and also a direction perpendicular to the optical axis and information track, it is possible to displace the objective lens 4 precisely by eliminating the influence of the leakage magnetic flux produced by the focussing permanent magnet and symmetrical with respect to the optical axis.

That is, if use is made of a voice coil type focussing driving mechanism, the movable members 1-1, 1-2 and the holding frame 15 are mounted through the leaf springs 6-1, 6-2 on a member around which is wound the voice coil. In this case, the magnetic path formed by the focussing driving mechanism is concentrically symmetrical with respect to the optical axis of the objective lens 4. As a result, the distribution of the leakage flux from this magnetic path is concentrically symmetrical with respect to the optical axis. In general, the mass (of the order of 3 gr.) of the movable member of the focussing driving mechanism is larger than the mass (of the order of 0.5 gr.) of the movable member of the tracking driving mechanism, so that the influence of the leakage flux exerted from the focussing driving mechanism to the tracking driving mechanism is far larger than that exerted from the tracking driving mechanism to the focussing driving mechanism. But, if the magnetic flux distribution of the tracking driving mechanism is made substantially symmetrical with respect to the optical axis of the objective lens 4 as in the embodiment shown in FIG. 4, the influence of the leakage flux produced from the focussing driving mechanism and concentrically symmetrical with respect to the optical axis of the objective lens 4 is effectively eliminated, so that it is possible to correct the tracking error and focussing error in a more precise manner.

In the embodiment shown in FIG. 4, if the distribution of the magnetic flux produced by the two sets of driving means is made symmetrical with respect to a plane defined by the optical axis of the objective lens 4 and the moving direction D, that is, if the permanent magnet 16-2 is secured to the left side of the stationary yoke 2-2 and the coil 3-2 is wound around the right end portion of the stationary yoke 2-2 and the coil 3-2 is supplied with an electric current in the same direction as that flowing through the coil 3-1, the holding frame 15 may comprise a magnetic body and may be made integral with the movable members 1-1, 1-2.

In addition, in the embodiments shown in FIGS. 4 to 6, the magnetic field generation means may comprise the permanent magnets secured to the movable member or the permanent magnets secured to both the movable member and the stationary yoke. In addition, the space formed between the stationary yoke and the movable member in each of the closed loops of the magnetic fields A-1, A-2 may be filled with magnetic fluid as in the case described with reference to FIG. 2 for the purpose of improving the damping effect and utility efficiency of the magnetic flux.

Figure 7:
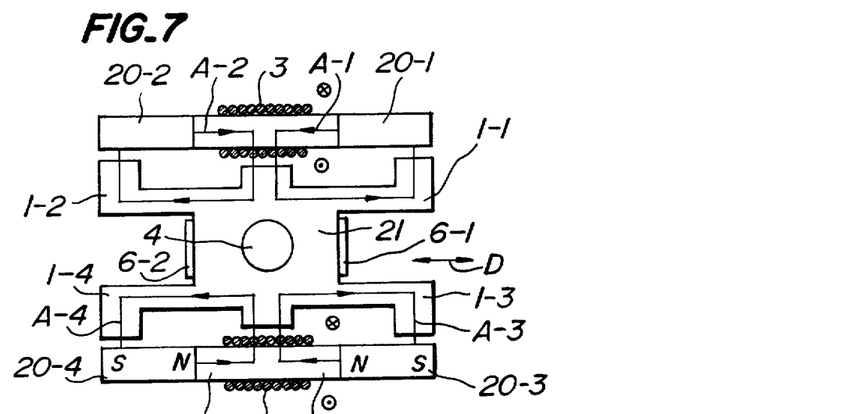

FIG. 7 shows a sixth embodiment of an objective lens driving device according to the invention. In this embodiment, two sets of driving means, each constructed as shown in FIG. 6, are arranged at both sides of a holding frame 21 in a direction perpendicular to the moving direction D of the objective lens 4 such that the magnetic flux distributions are symmetrical with respect to a plane formed by the optical axis of the objective lens 4 and the moving direction D. That is, the objective lens 4 is driven by four sets of driving means. Reference numerals 1-3, 1-4 designate movable members each comprising a magnetic body, respectively; 2-3, 2-4 stationary yokes; 20-3, 20-4 permanent magnets producing closed loop magnetic fields A-3, A-4, respectively; and 3' a coil wound around the stationary yokes 2-3, 2-4 in common and constituting third and fourth sets of driving means.

In this embodiment, use is made of four sets of driving means. As a result, if the coils 3, 3' are supplied with an electric current corresponding to the amount of tracking error in a direction corresponding to the tracking error direction as shown by symbols ⊗ , ⊙ or in a direction opposed thereto, it is possible to drive the objective lens 4 by a sufficiently larger amount of force. In this embodiment, the magnetic field generation means may comprise permanent magnets secured to the movable member or to both the movable member and the stationary yoke. In addition, air gaps formed between the stationary yoke and the movable member in the path of the closed loop magnetic fields A-1, A-2, A-3, A-4 produced by the first, second, third and fourth driving means may be filled with a magnetic fluid, thereby improving the damping effect and the utility efficiency of the magnetic flux.

Figure 8:
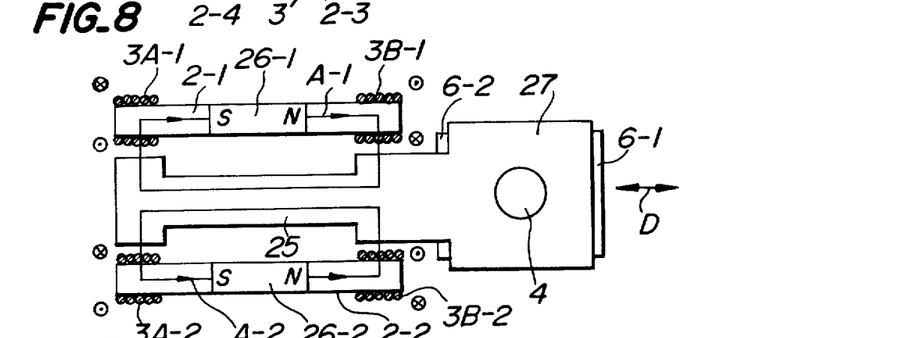
FIGS. 8 and 9 are diagrammatic view of seventh and eighth embodiments of an objective lens driving device according to the invention, each making use of the driving means shown in FIG. 1B.
Figure 9:
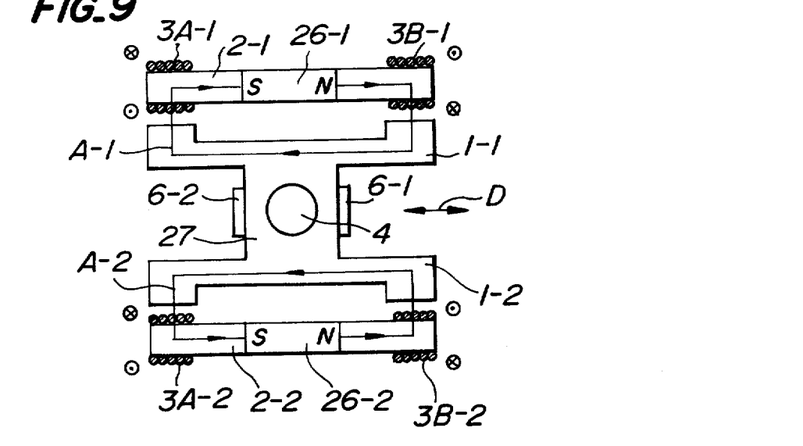

FIGS. 8 and 9 show seventh and eighth embodiments of an objective lens driving device according to the invention, respectively. In these embodiments, use is made of two sets of driving means constructed as shown in FIG. 1B.

In the embodiment shown in FIG. 8, a movable member 25 comprising a magnetic body is used in commmon for two sets of driving means. Stationary yokes 2-1, 2-2 extend in a direction which is substantially parallel to the moving direction D of the movable member 25, i.e. the tracking error correction direction, and are arranged at both sides of the movable member 25 and spaced apart therefrom. In this embodiment, coils 3A-1, 3B-1 and 3A-2, 3B-2 are wound around both end portions of the stationary yokes 2-1, 2-2, respectively, and are made symmetrical with respect to the movable member 25. The stationary yokes 2-1, 2-2 are provided at substantially central portions thereof with permanent magnets 26-1, 26-2, respectively. The permanent magnet 26-1 functions to form a closed loop magnetic field A-1 crossing the coils 3A-1, 3B-1 and passing through the movable member 25 and stationary yoke 2-1, whereas the permanent magnet 26-2 functions to form a closed loop magnetic field A-2 crossing the coils 3A-2, 3B-2 and passing through the movable member 25 and stationary yoke 2-2. The objective lens 4 is held by a holding frame 27 secured to the movable member 25 and the movable member 25 and holding frame 27 as a whole are movably supported by means of a supporting means comprising a pair of leaf springs 6-1, 6-2 such that the objective lens 4 is movable in the moving direction of the movable member 25 as shown by arrow D, i.e. the tracking error correction direction. The holding frame 27 may be made integral with the movable member 25.

In the embodiment shown in FIG. 9, the holding frame 27 is provided at both sides thereof with movable members 1-1, 1-2 viewed in a direction perpendicular to the tracking error correction direction D of the holding frame 27 and hence of the objective lens 4 so as to provide two sets of driving means. The movable members 1-1, 1-2 and holding frame 27 may comprise a magnetic body or be made integral into one body. The movable member may comprise a non-magnetic body.

In the embodiments shown in FIGS. 8 and 9, use is made of two sets of driving means. As a result, if respective coils are supplied with an electric current in a direction corresponding to the tracking error direction and shown by symbols ⊗ , ⊙ or in an opposite direction corresponding to the amount of the tracking error, it is possible to drive the objective lens 4 with a sufficiently large amount of force and hence to correct the tracking error precisely.

Even in the embodiments shown in FIGS. 8 and 9, the permanent magnets may be secured to the movable member or to both the movable member and the stationary yoke so as to constitute a magnetic field generation means. In addition, a magnetic fluid may be filled into the space or gap formed between the stationary yoke and the movable member in the paths of the magnetic fields A-1, A-2 for the purpose of improving the damping effect and the utility efficiency of the magnetic flux.

In the above mentioned embodiments shown in FIGS. 2 to 9, respectively, the pair of leaf springs 6-1, 6-2 constituting the objective lens supporting means extend in a direction perpendicular to the drawing surface. Alternatively, the pair of leaf springs 6-1, 6-2 may extend in a direction parallel to the drawing surface and be made symmetrical with respect to the optical axis of the objective lens or to a plane inclusive of the optical axis. In addition, the objective lens 4 may be movably supported by means of one leaf spring in a desired direction.

Figure 10A:
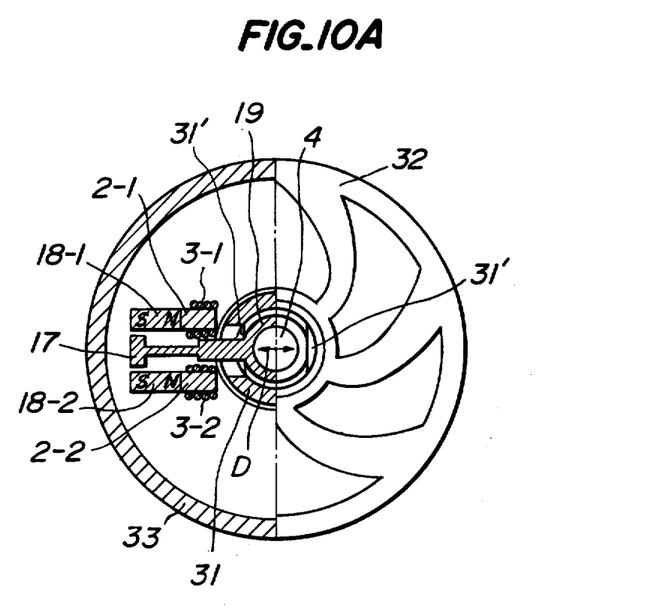
FIG. 10A is a plan view of a ninth embodiment of an objective lens driving device according to the invention which can drive the objective lens in two dimensions, partly shown in section.
Figure 10B:
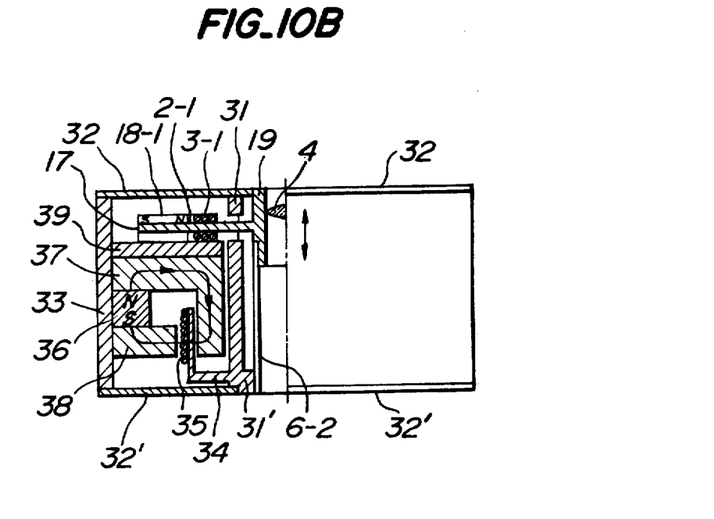
FIG. 10B is a front elevational view of the embodiment of FIG. 10A, partly shown in section.

FIGS. 10A and 10B show a ninth embodiment of an objective lens driving device according to the invention. In this embodiment, the objective lens 4 is made movable in two dimensions, i.e. in both the tracking error correction direction D and the focussing error correction direction, that is, the direction of the optical axis of the objective lens. As a mechanism for displacing the objective lens in the tracking error correction direction, use may be made of any one of the mechanisms described with reference to FIGS. 2 to 9. In this embodiment, the mechanism shown in FIG. 5 is used. The holding frame 19 for holding the objective lens 4 is secured through the pair of leaf springs 6-1, 6-2 to a projection 31' of an intermediate frame 31. As a result, the objective lens 4 is displaceable in the direction shown by arrow D in FIG. 10A, that is, in the tracking error correction direction. The intermediate frame 31 is secured through a pair of circular springs 32 and 32' to an outer frame 33. As a result, the intermediate frame 31 together with the objective lens 4 and its holding frame 19 are displaceable in the optical axis direction of the objective lens 4, that is, in the focussing error correction direction.

In order to displace intermediate frame 31 in the optical axis direction so as to effect focussing control, around a ring 34 made integral with the intermediate frame 31 is wound a coil 35 adapted to be supplied with the focussing error signal; a permanent magnet 36 and yokes 37, 38 cooperative with the coil 35 are secured to the outer frame 33. Two sets of driving means are provided which make use in common of a movable member 17 made integral with or connected to the holding frame 19. These driving means, exclusive of the movable member 17, are secured through a non-magnetic base plate 39 disposed on the yoke 37 to the outer frame 33 for the purpose of preventing the driving means from magnetically interfering with the focussing driving mechanism.

The objective lens driving device according to the present embodiment constructed as above described is small and lightweight. In addition, it is possible to move the objective lens 4 effectively in both the tracking error correction direction and the focussing error correction direction in response to respective amount of errors to be corrected. Moreover, if a magnetic fluid is filled in a space formed between the movable member 17 and the stationary yokes 2-1, 2-2 in the closed loop magnetic field path, a good damping property can be obtained even in the focussing error correction direction.

As stated above, the objective lens driving device according to the present invention has a number of advantages. In the first place, it is possible to move the objective lens precisely in the tracking error correction direction by a sufficiently large amount of force. Secondly, the device is small and lightweight. Third, the device can effectively drive the objective lens in two-dimensions, that is, in both the tracking error correction direction and the focussing error correction direction. Fourth, it is possible easily to adjust the space formed between the movable member and the stationary yoke and hence easily to construct a desired magnetic path. Finally, the device is easy to assemble.

I claim:

1. In an objective lens driving device for correcting a relative positional error, i.e., a tracking error, between an information track recorded spirally or concentrically on a record medium and a reading-out light spot projected onto the record medium by means of the objective lens by moving the objective lens in a direction perpendicular to the optical axis of said objective lens and information track, the improvement which comprises:

at least one set of objective lens driving means, each set including:
an elongated movable member comprising a magnetic body movable together with the objective lens or a holding frame therefor;
a stationary yoke extending in a direction which is substantially parallel with the moving direction of said movable member and spaced apart from and opposed to said movable member at both end portions to provide interposing gaps;
a magnetic field generation means for producing a closed loop magnetic field passing through said movable member and stationary yoke via said gaps;
a coil wound around at least one end portion of said stationary yoke such that at least one portion of said coil is exposed to the magnetic field produced by said magnetic field generation means in at least one said gap; and
objective lens supporting means for movably supporting said objective lens in said direction perpendicular to the optical axis of said objective lens and information track;
said coil being supplied with an electric current corresponding to a tracking error signal representing said relative positional error so as to displace said movable member comprising the magnetic body and hence said objective lens in said direction perpendicular to the optical axis of said objective lens and information track to correct the tracking error.

2. The device according to claim 1, wherein said stationary yoke including said coil wound around it is mounted on a stationary member, and said movable member together with said supporting means are mounted on a focussing mechansim displaceable along the optical axis of said objective lens, whereby said objective lens is displaceable in two dimensions, i.e. in both the direction of the optical axis of the objective lens and said direction perpendicular to the optical axis of the objective lens and the information track.

3. The device according to claim 1, wherein a magnetic fluid is filled in the gaps formed between said end portions of the movable member and said stationary yoke and constitutes at least one portion of the magnetic field produced by said magnetic field generation means.

4. The device according to claim 1, wherein said objective lens supporting means comprises a pair of leaf springs extending in a direction of the optical axis of the objective lens, each leaf spring having one end secured to the holding frame of said objective lens and having the other end secured to a stationary member.

5. The device according to claim 1, wherein said magnetic field generation means comprises a permanent magnet constituting one end portion of said stationary yoke.

6. The device according to claim 1, wherein said magnetic field generation means comprises two permanent magnets constituting two end portions of said movable member.

7. The device according to claim 1, wherein projections are formed at both end portions of said movable member.

8. The device according to claim 1, wherein projections are formed at both end portions of said stationary yoke.

* * * * *